United States Patent
Barbour

[11] Patent Number: 5,842,445
[45] Date of Patent: Dec. 1, 1998

[54] APPARATUS FOR ATTACHING A PET LEASH TO A BICYCLE

[76] Inventor: Gregory C. Barbour, P.O. Box 147, Yucca, Ariz. 86438

[21] Appl. No.: 813,451

[22] Filed: Mar. 10, 1997

[51] Int. Cl.$^6$ ..................................................... A01K 15/00
[52] U.S. Cl. ............................................................. 119/771
[58] Field of Search ..................................... 119/771, 772, 119/769, 777, 778, 779, 780

[56] References Cited

U.S. PATENT DOCUMENTS

| | | | |
|---|---|---|---|
| 3,222,034 | 12/1965 | Jackson | 280/288.4 X |
| 4,854,269 | 8/1989 | Arntzen | 119/703 |
| 5,033,409 | 7/1991 | Sabot | 119/771 X |
| 5,215,037 | 6/1993 | Allred | 119/771 |
| 5,375,561 | 12/1994 | Gundersen | 119/771 |

Primary Examiner—Gene Mancene
Assistant Examiner—Yvonne R. Abbott
Attorney, Agent, or Firm—David L. Volk

[57] ABSTRACT

A generally v-shaped bar includes two legs and a radiused apex. A connector is attached to two ends of the bar opposite the apex and is adapted for connection to a front of a bicycle above a front tire. The connections of the ends of the bar to the connector are lower than the connection of the connector to the bicycle when the bicycle is upright. The bar extends away from the connector toward the apex. The legs are disposed above and on opposing sides of the front tire of the bicycle when the connector is attached to the front of the bicycle above the front tire. A clasp is configured to freely slide along the bar and to releasably and securely attach to a pet leash.

7 Claims, 3 Drawing Sheets

APPARATUS FOR ATTACHING A PET LEASH TO A BICYCLE

BACKGROUND OF THE INVENTION

1. Field of the Invention

The present invention relates to pet exercise devices, particularly to an apparatus for attaching a pet leash to a bicycle.

2. Description of the Related Art

Many pets, particularly many breeds of dogs, love to run. This provides them with needed play time and exercise. Unfortunately, many pet owners with small or unfenced yards can't allow their pets to take an extended run.

In the prior art, devices have been developed for attaching a pet leash to a bicycle. The pet owner uses the device by attaching it to the bicycle frame, then by attaching the leash to the device. The pet is attached in a conventional fashion to the other end of the leash, and the pet owner rides the bicycle, with the pet running along. Although all of these prior art devices are generally adequate for allowing a pet to have exercise under the supervision of its owner, none of them provides all of the advantages of the present invention, which include simplicity of design, a design which helps to keep the pet in the owner's view, a design which helps to prevent adverse effects to the steering and the stability of the bike due to pulling of the leash by the pet in a transverse direction relative to the movement of the bicycle, a design which allows a great range of movement for the pet, and a design which keeps the leash away from the bicycle tires and pedals, and a design which is unobtrusive and can therefore remain mounted on the bicycle at all times, even when not in use.

SUMMARY OF THE INVENTION

The apparatus of the present invention for attaching a pet leash to a bicycle comprises a generally v-shaped bar comprising two legs and a radiused apex. A connector is attached to two ends of the bar opposite the apex and is adapted for connection to a front of a bicycle above a front tire. The connections of the ends of the bar to the connector are lower than the connection of the connector to the bicycle when the bicycle is upright. The bar extends away from the connector toward the apex. The legs are disposed above and on opposing sides of the front tire of the bicycle when the connector is attached to the front of the bicycle above the front tire. A clasp is configured to freely slide along the bar and to releasably and securely attach to a pet leash.

Because the apparatus comprises only a v-shaped bar, a simple connector and a clasp, the device is simple and inexpensive to build, inexpensive to the consumer, reliable and long lasting compared to more complicated devices of the prior art.

Because the apparatus is adapted for connnection to the front of a bicycle, the pet is more readily kept in the owner's view compared to devices of the prior art.

Because the ends of the bar are attached to the connector lower than the connection of the connector to the front of the bicycle, the tilting or tipping effect of the leash on the bicycle when the leash is pulled transverse to the motion of the bicycle is minimized.

Because the v-shaped bar extends away from the connector toward the apex, because the legs are disposed above and on opposing sides of the front tire, and because the clasp is configured to freely slide along the bar, pulling of the leash transverse to the motion of the bicycle will cause the clasp to slide from the apex toward the connector which is attached to the yoke assembly directly above the tire, thus reducing the effect of the pulling of the leash on the steering of the bicycle.

Because the legs are disposed above and on opposing sides of the front tire, and because the clasp is configured to freely slide along the bar, the pet is allowed a great range of movement to both sides and in front of the bicycle.

Because the connector is adapted for connection to a bicycle above the front tire, the leash is generally kept away from the bicycle tires and pedals, thereby helping to avoid potential accidents or injury.

Because the connector is adapted for connection to a front of a bicycle above the front tire, and because the v-shaped bar extends away from the connector toward the apex with the legs disposed above and on opposing sides of the tire, the apparatus is unobtrusive and can remain mounted on the bicycle at all times, even when not in use.

Still further features and benefits will become apparent from the ensuing description and drawings.

DETAILED DESCRIPTION

Figure 1:
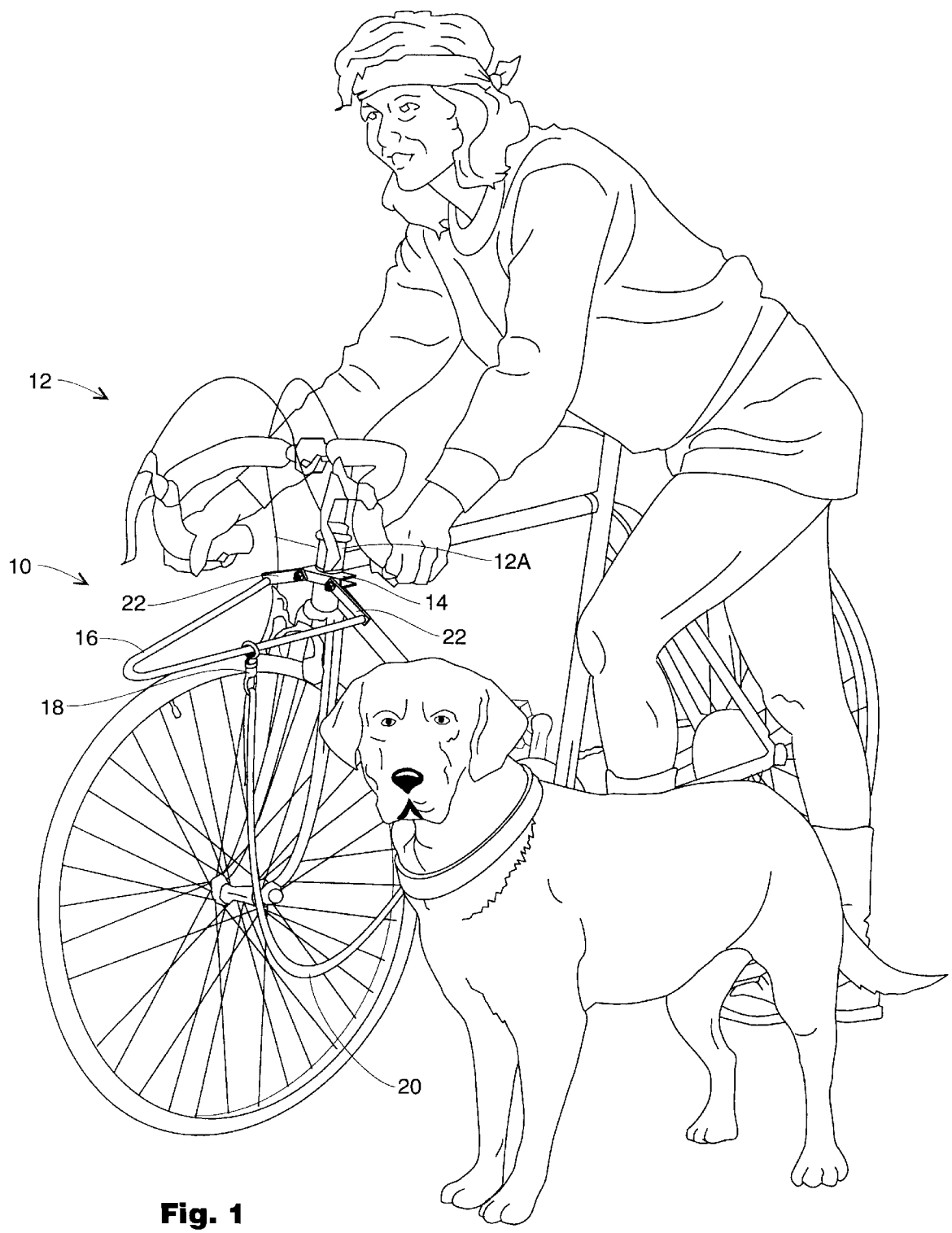
FIG. 1 is a perspective view of the apparatus mounted to a bicycle and ready for use.

FIG. 1 is a perspective view of an apparatus 10 mounted to a bicycle 12 and ready for use. The apparatus 10 includes a connector 14 which is attached to a yoke assembly 12A of the bicycle 12. The apparatus 10 further comprises a generally v-shaped bar 16. A clasp 18 slides freely along the bar and is releasably and securely attached to a pet leash 20, which is attached to a dog's collar. The dog is free to run along either side, or in front of his owner's bike. The apparatus 10 is adapted for use with any conventional bicycle and pet leash.

Figure 2:
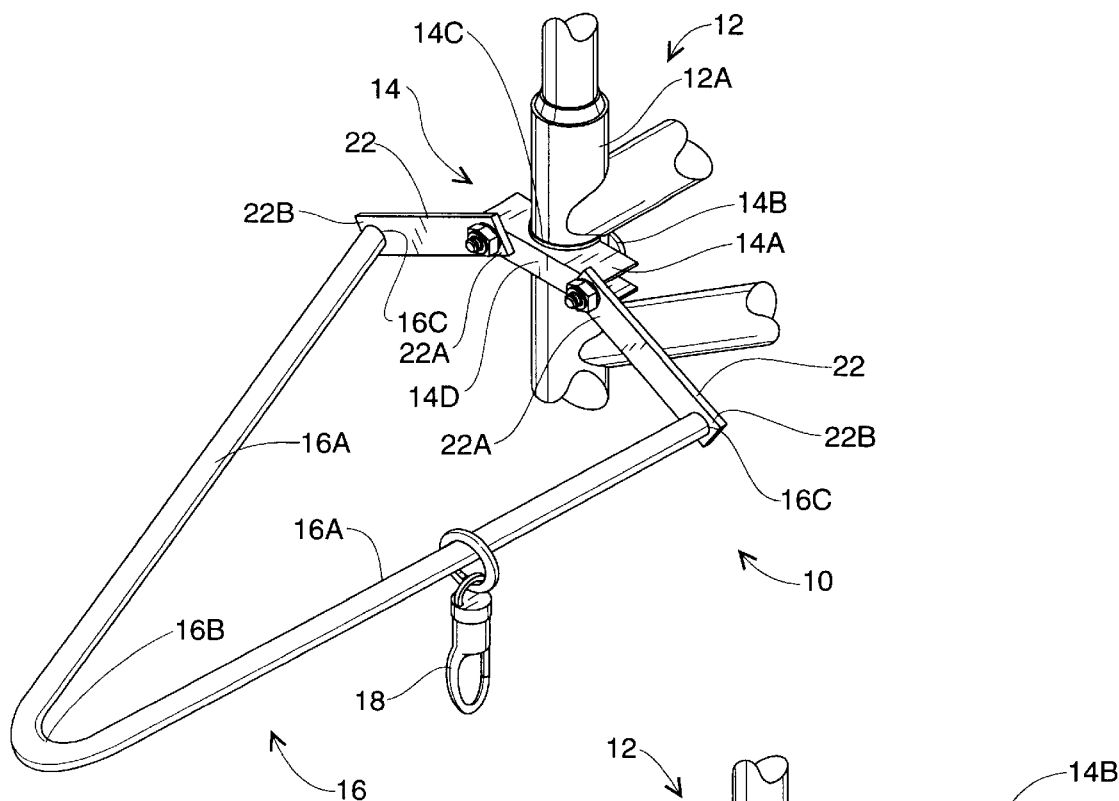
FIG. 2 is an enlarged perspective view of the apparatus connected to the bicycle.
Figure 3:
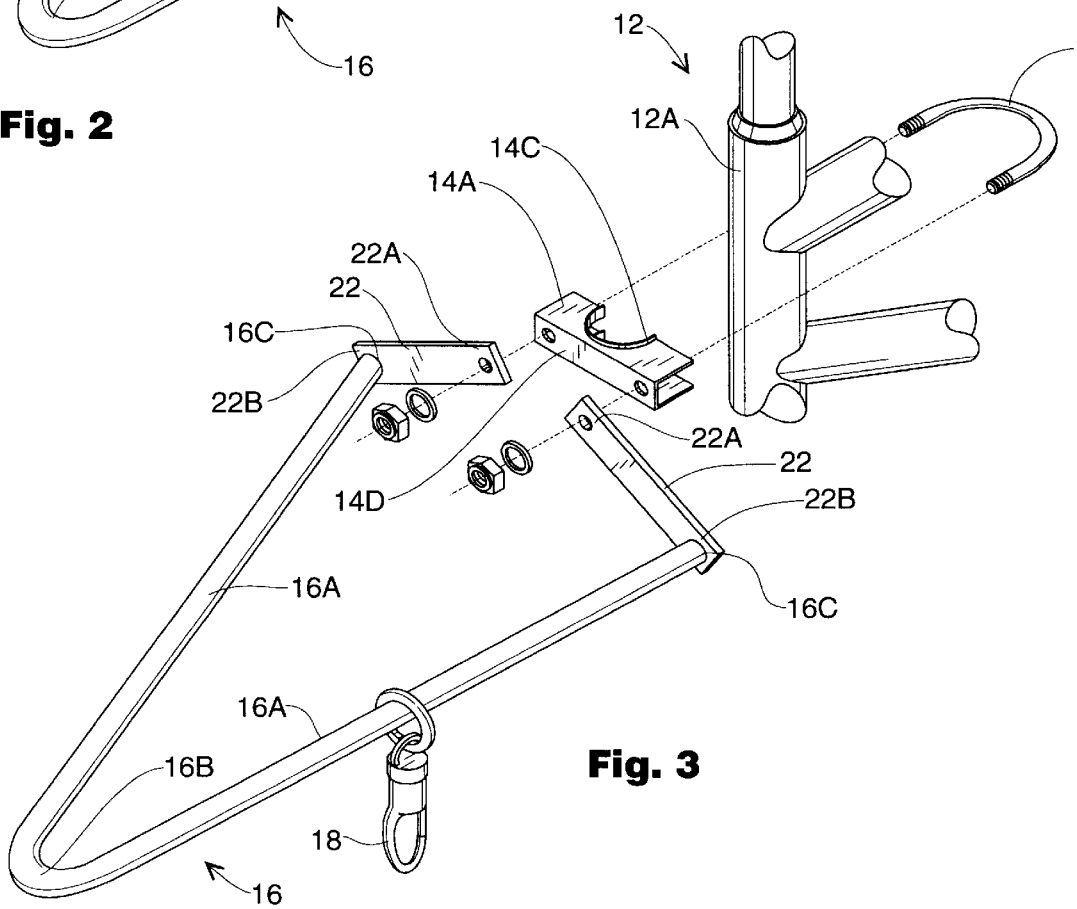
FIG. 3 is an exploded perspective view of the apparatus connected to the bicycle.

FIG. 2 is an enlarged perspective view of the apparatus 10 connected to the bicycle 12, and FIG. 3 is an exploded perspective view thereof. The v-shaped bar 16 comprises two legs 16A and a radiused apex 16B. The bar 16 further comprises two ends 16C disposed opposite the apex 16B.

The connector 14 comprises a mounting bracket 14A and a u-bolt 14B. The mounting bracket 14A includes structure forming a half sleeve 14C opposite a generally planar face 14D. The half sleeve 14C is rubber-lined, and is adapted to fit snugly against the yoke assembly 12A. The u-bolt 14B extends through the mounting bracket 14A and fits snugly against the yoke assembly 12A opposite the half sleeve 14C.

The u-bolt 14B extends through inward ends 22A of two generally elongated plates 22 disposed against the face 14D of the mounting bracket 14A. Nuts at the ends of the u-bolt 14B secure the plates 22 to the mounting bracket 14A and secure the u-bolt 14B and the mounting bracket 14A to the yoke assembly 12A.

When the bicycle 12 is generally upright and the connector 14 is attached to the yoke assembly 12A, the plates 22 extend downward and away from the inward end 22A toward an outer end 22B. The ends 16C of the bar 16 are attached to plates 22 near the outer end 22B.

Figure 4:
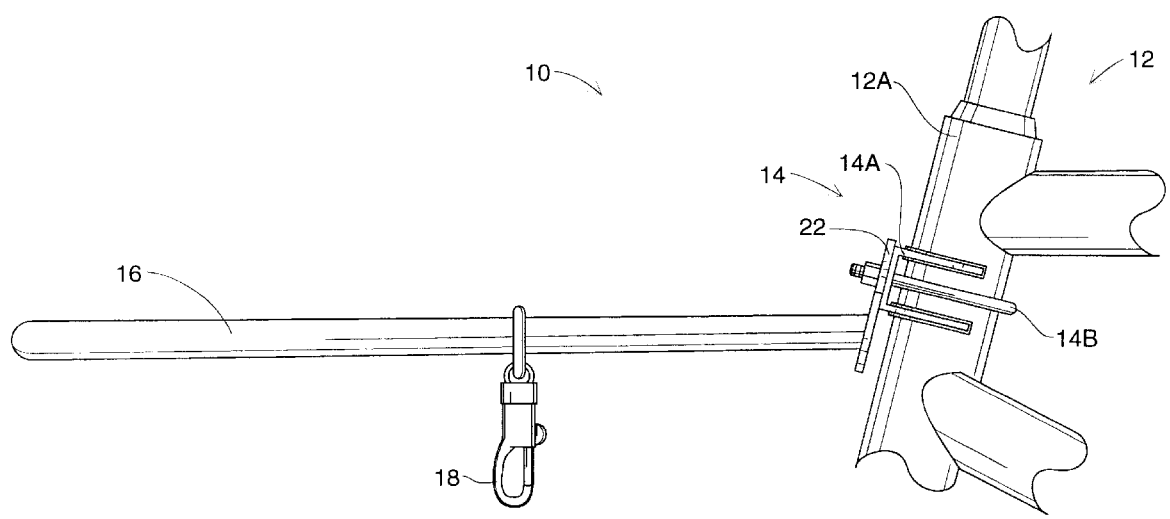
FIG. 4 is a side elevational view of the apparatus connected to the bicycle.

FIG. 4 is a side elevational view of the apparatus 10 connected to the bicycle 12. The bar 16 is disposed at an acute angle with respect to the plates 22, such that when the connector 14 is attached to the yoke assembly 12A and the bicycle 12 is generally upright, the bar 16 is disposed generally horizontally.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. The scope of the invention is to be limited only by the following claims and their legal equivalents.

The invention claimed is:

1. An apparatus for attaching a pet leash to a bicycle, the apparatus comprising:

a generally v-shaped bar comprising two legs and a radiused apex;

the bar comprising two ends disposed opposite the apex;

a connection means attached to the two ends and adapted for connection to a front of a bicycle above a front tire;

the bar extending away from the connection means toward the apex;

the legs disposed above and on opposing sides of a front tire when the connection means is attached to a front of a bicycle above the front tire;

a clasp configured to freely slide along the bar and to releasably and securely attach to a pet leash.

2. The apparatus of claim 1, wherein the bar extends generally horizontally and away from the upright bicycle when the connection means is attached to a yoke assembly of the bicycle.

3. The apparatus of claim 2, wherein the ends of the bar are positioned lower than a point of attachment of the connection means to the upright bicycle when the connection means is attached to the yoke assembly of the bicycle.

4. The apparatus of claim 1, wherein the ends of the bar are positioned lower than a point of attachment of the connection means to an upright bicycle when the connection means is attached to a yoke assembly of the bicycle.

5. An apparatus for attaching a pet leash to a bicycle, the apparatus comprising:

a bicycle connection means for connecting to a front of a bicycle above a front tire;

two legs attached to the bicycle connection means and extending away from the connection means toward a distal end;

the two legs disposed above and on opposing sides of a front tire when the bicycle connection means is attached to the front of the bicycle above the front tire;

an extension at the distal end connected to each of the legs; and a clasp configured to freely slide along the legs and the extension and to releasably and securely attach to a pet leash.

6. The apparatus of claim 5, wherein the legs extend generally horizontally and away from the upright bicycle when the connection means is attached to a yoke assembly of the bicycle.

7. The apparatus of claim 6, wherein the legs connect to the connection means lower than a point of attachment of the connection means to the upright bicycle when the connection means is atttached to the yoke assembly of the bicycle.

* * * * *